United States Patent [19]
Giere

[11] Patent Number: 4,606,428
[45] Date of Patent: Aug. 19, 1986

[54] TRANSAXLE DIFFERENTIAL

[75] Inventor: David W. Giere, Chaska, Minn.

[73] Assignee: Eaton Corporation, Cleveland, Ohio

[21] Appl. No.: 724,852

[22] Filed: Apr. 18, 1985

[51] Int. Cl.$^4$ ............................................. B60K 17/00
[52] U.S. Cl. .................................... 180/307; 180/308; 60/484
[58] Field of Search ............... 180/305, 307, 308; 137/98, 100; 60/427, 484, 485; 91/520

[56] References Cited
U.S. PATENT DOCUMENTS

| | | | |
|---|---|---|---|
| 3,033,219 | 5/1962 | Erle | 137/100 |
| 3,039,266 | 6/1962 | Schenkelberger | 60/52 |
| 3,195,669 | 7/1965 | Court | 180/66 |
| 3,293,848 | 12/1966 | Kuze | 60/53 |
| 3,495,610 | 2/1970 | Van Aken | 137/99 |
| 4,354,688 | 10/1982 | Swanson | 280/43.23 |

Primary Examiner—John J. Love
Assistant Examiner—Richard Camby
Attorney, Agent, or Firm—C. H. Grace; L. J. Kasper

[57] ABSTRACT

A hydrostatic transaxle assembly (11) is disclosed including a central manifold portion (15) and left and right axle assemblies (17 and 19). The axle assemblies include hydraulic motors (37 and 39) connected in parallel through the manifold 15 to the output of a variable displacement pump (13). The transaxle assembly includes a differential mechanism (111), including fluid displacement mechanisms (113 and 115) of which the inner rotors (127) are connected for common rotation by a shaft (117). The differential mechanism (111) includes a selector valve (119; 161) which can either interconnect left and right passages (33b and 35b), downstream of the mechanisms (113 and 115) to permit normal differentiating action, or can prevent such communication between the passages (33b) and (35b) to cause limited differentiating action of the transaxle assembly.

14 Claims, 6 Drawing Figures

TRANSAXLE DIFFERENTIAL

BACKGROUND OF THE DISCLOSURE

The present invention relates to hydrostatic transaxle assemblies, and more particularly, to such assemblies which have the capability for the operator to select from among various operating modes.

Certain vehicles, such as lawn and garden tractors, and smaller farm tractors, have used hydrostatic transaxle assemblies for transmitting engine torque to a pair of ground-engaging drive wheels to propel the vehicle. A typical transaxle assembly which has been used commercially included a variable displacement hydraulic pump, such that the ratio of pump output flow to pump input speed (engine speed) could be infinitely varied by the vehicle operator. This ability to infinitely vary the output-input ratio, without interrupting torque transmission, makes transaxle assemblies greatly preferred over conventional clutch and gear transmission arrangements for vehicles of the type referred to above.

Vehicles of the type referred to above which utilize transaxle assemblies frequently encounter operating conditions in which one of the drive wheels has less traction than the other drive wheel, and it has long been recognized by the manufacturers of such vehicles that it is desirable to provide the operator of the vehicle with some type of control arrangement for effectively dealing with such loss of traction situations. At the same time, however, it is recognized that under most operating conditions, the vehicle must be able to have "normal differentiating action" between the two drive wheels, i.e., it must be possible for the two drive wheels to be driven at substantially different speeds, such as during a sharp turn.

In addition to dealing with the loss of traction situation, there are various other operating conditions which occur with such vehicles. For example, such vehicles are frequently towed a substantial distance, such as to a particular work site, and if the transaxle is left in its normal operating mode during towing, the result can be excessive wear of internal parts, and overheating of rapidly circulating hydraulic fluid, especially if the vehicle is being towed at a speed faster than its normal driving speed. In addition, it is normally desirable for transaxle assemblies on vehicles of this type to have the capability of both low-speed, high-torque operation (working mode) and high-speed, low-torque operation (transport mode).

PRIOR ART

Prior to the time of the present invention, the commercially used transaxle assembly included a hydrostatic transmission (HST) and a mechanical axle assembly. The HST would typically be a light-duty HST such as the Model 11 sold by Eaton Corporation. The HST would transmit engine torque to the input of the axle assembly which would include a spur and/or bevel gear reduction unit and a pair of output axles for attachment to the drive wheels. The axle assembly would typically include some sort of differential to permit normal differentiating action between the left and right wheels. On such axle assemblies, it is known to provide some sort of automotive-type limited slip or locking differential to prevent spinout of one wheel relative to the other in loss of traction situations. Although a transaxle assembly of the type described above has provided generally satisfactory performance, the excessive size, weight and cost of such a unit makes it commercially less desirable.

In another commercially known type of prior art vehicle propel system, a variable displacement pump provides pressurized fluid to a pair of hydraulic wheel motors which are connected in parallel, which transmit torque to the vehicle drive wheels. In this type of propel system, it is necessary to provide hose connections from the pump to each of the motors which is frequently considered undesirable. In order to limit spinout of one of the wheels relative to the other in such a system, it is known to use a flow divider valve of the type shown in U.S. Pat. No. 3,195,669. Although such a flow divider valve does take away hydraulic torque from the wheel which has lost traction, it does not increase the hydraulic torque transmitted to the drive wheel which still has traction. Instead, it takes away torque from the slipping wheel by throttling flow to the respective wheel motor, thus generating a pressure drop and a substantial amount of heat which is undesirable in a closed loop hydraulic system.

SUMMARY OF THE INVENTION

Accordingly, it is an object of the present invention to provide a hydrostatic transaxle assembly which overcomes the problems associated with the prior art transaxle and vehicle propel systems described above, and at the same time includes the capability of dealing effectively with loss of traction situations.

It is another object of the present invention to provide a hydrostatic transaxle assembly of the type which achieves the above-stated objects while providing the operator with the capability of selecting between a normal differentiating mode of operation and a limited differentiating mode of operation.

It is a further object of the present invention to provide a hydrostatic transaxle assembly which accomplishes the above-stated objects, and also provides the operator with the capability of selecting from among various other operating modes in a manner which is relatively simple and inexpensive.

The above and other objects of the present invention are accomplished by the provision of a hydrostatic transaxle assembly for use on a vehicle having a vehicle frame, a source of motive power, a fluid pump driven by the source of power, and a pair of driven wheels. The transaxle assembly comprises a centrally-disposed manifold and first and second motor assemblies. The manifold defines a fluid inlet adapted to be in communication with the outlet of the pump and a fluid outlet adapted to be in communication with the inlet of the pump. The manifold further defines first and second fluid passage means communicating between the inlet and outlet of the manifold and flowing through the first and second motor assemblies, respectively. Each of the first and second motor assemblies has a rotary fluid pressure actuated device and axle means operable to transmit the rotary output of the fluid pressure actuated device to the respective driven wheel. The two fluid pressure actuated devices of the first and second motors have substantially equal fluid displacements.

The transaxle assembly is characterized by inter-wheel differential means including first and second rotary fluid displacement mechanisms disposed in series flow relationship in the first and second fluid passage means, respectively. The first and second fluid displacement mechanisms have substantially equal fluid displacement and include first and second rotor elements respectively, which are connected for common rotation. A selector valve means is in fluid communication with at least one of the fluid displacement mechanisms and is operable selectively between first and second positions. In the first position of the selector valve means, fluid flowing from the pump flows through the first and second fluid displacement mechanisms in two substantially equal flows and the selector valve means prevents substantial fluid communication between the first and second fluid passage means downstream of the first and second fluid displacement mechanisms. Thus, substantially equal fluid flow is maintained through the fluid pressure actuated devices of the motor assemblies to maintain substantially equal speeds of the driven wheels. In the second position of the selector valve means, the fluid flows through the pressure actuated devices of the motor assemblies are not maintained substantially equal, thus permitting normal differentiation between the motor assemblies and the speeds of the driven wheels.

DESCRIPTION OF THE PREFERRED EMBODIMENTS

Figure 1:
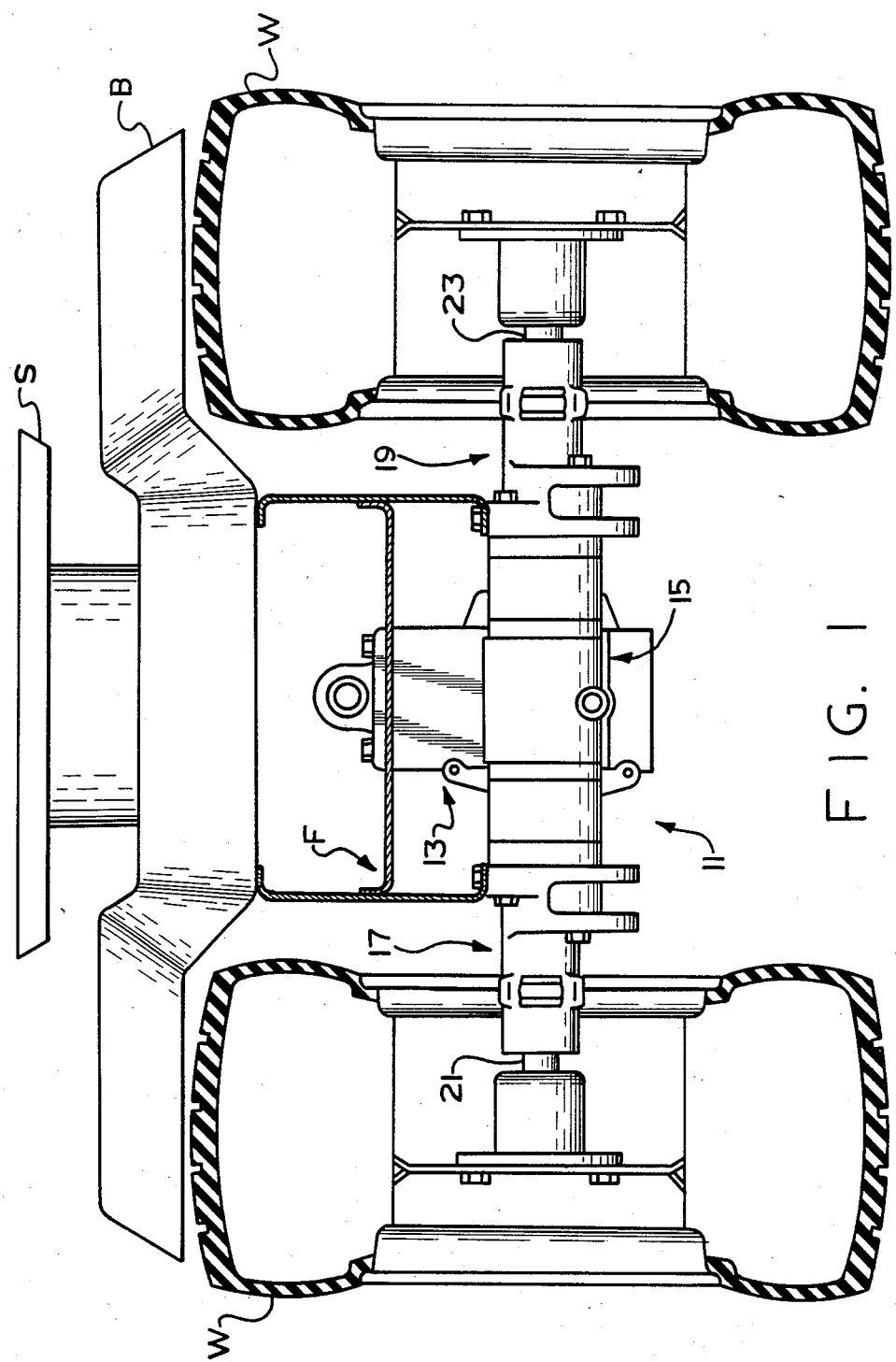
FIG. 1 is a rear plan view, partly in cross-section, of a vehicle such as a garden tractor equipped with a hydrostatic transaxle assembly of the type to which the present invention relates.

Referring now to the drawings, which are not intended to limit the invention, FIG. 1 is a rear plan view showing the transaxle assembly of the present invention, generally designated 11 installed on a typical garden tractor. The tractor includes a vehicle frame F which supports a stamped body and fender assembly B. Disposed above the body assembly B is a seat S for the vehicle operator. The tractor also includes a pair of ground-engaging wheels W which are adapted to be driven by the transaxle assembly 11.

The transaxle assembly 11 includes a variable displacement hydraulic pump, generally designated 13, a central manifold portion, generally designated 15, and left and right axle assemblies, generally designated 17 and 19 respectively. Extending out of the left axle assembly 17 is a left axle shaft 21, and extending out of the right axle assembly 19 is a right axle shaft 23. As is well known in the art, the axle shafts 21 and 23 extend into the hubs of the drive wheels W. Preferably, the drive wheels W comprise the sole source of propulsion for the vehicle shown in FIG. 1, and the transaxle assembly 11 comprises the sole source of propulsion for the drive wheels W.

Figure 2:
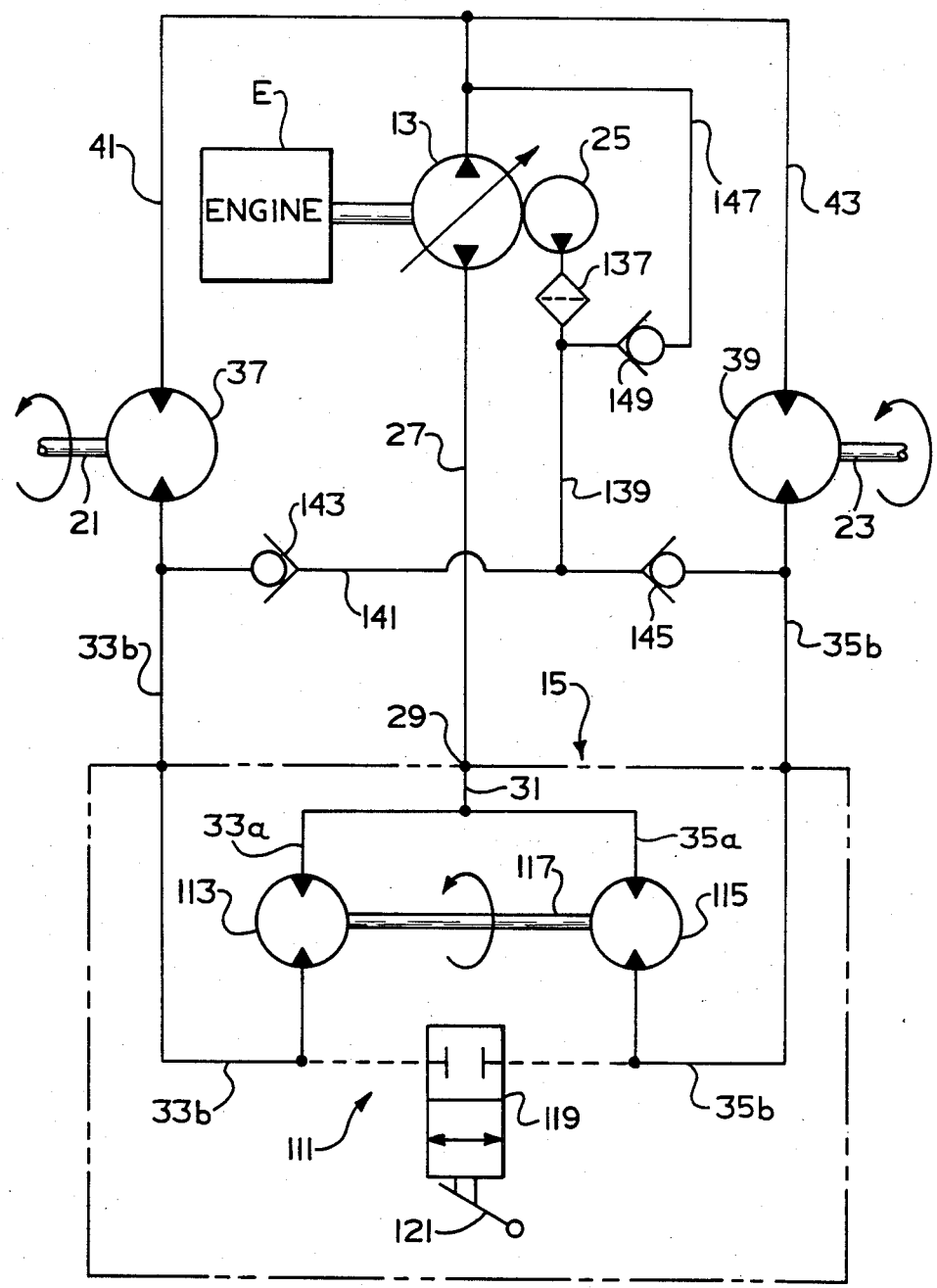
FIG. 2 is a hydraulic schematic of one embodiment of a transaxle assembly made in accordance with the present invention.

Referring now to FIG. 2, there is illustrated a hydraulic schematic of the transaxle assembly 11. The variable displacement hydraulic pump 13 is driven by a suitable source of motive power such as a vehicle engine E, and also driven by the engine E is a charge pump 25.

Pressurized output flow from the pump 13 is communicated by means of a conduit 27 to an inlet port 29 of the manifold portion 15. Within the manifold 15, fluid flows from the inlet port 29 through a fluid passage 31 which divides into a left passage 33 and a right passage 35, the passages 33 and 35 being illustrated in the drawings as 33a, 33b and 35a, 35b for reasons which will become apparent subsequently. Pressurized fluid in the passages 33 and 35 is communicated to hydraulic motors 37 and 39, respectively, which comprise part of the left and right axle assemblies 17 and 19, respectively. The output of the hydraulic motor 37 is the left axle shaft 21, while the output of the hydraulic motor 39 is the right axle shaft 23. Low pressure, exhaust fluid from the motor 37 is communicated by means of a left passage 41 to the inlet of the pump 13, while the low pressure, exhaust fluid from the motor 39 is communicated by means of a right passage 43 to the inlet of the pump 13. It should be understood that subsequent references to "first and second fluid passage means" will mean and include the left passages 33a, 33b and 41 and the right passages 35a, 35b and 43.

Figure 3:
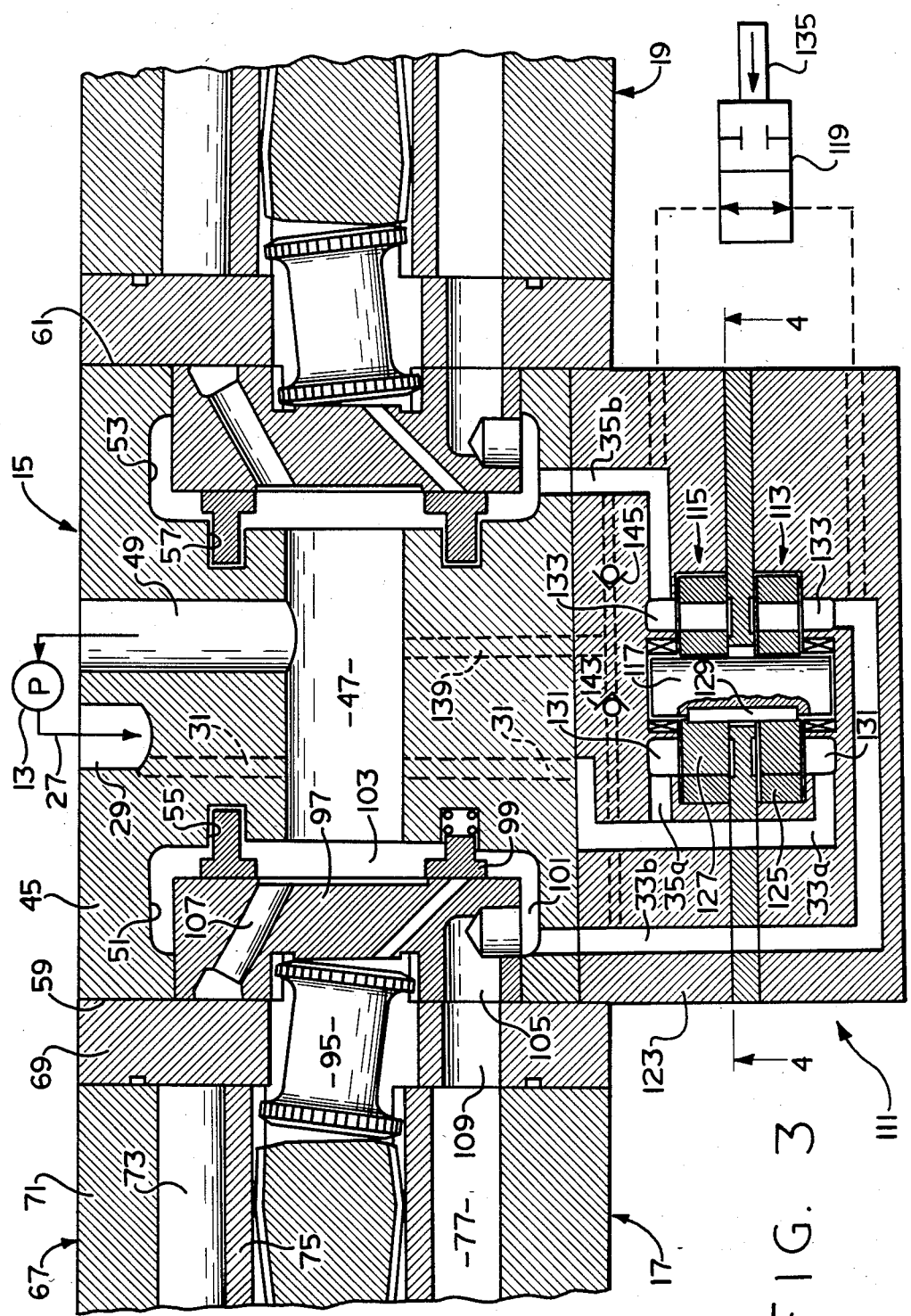
FIG. 3 is a horizontal, axial cross-section, somewhat schematic in nature, showing the central portion of a transaxle assembly utilizing the present invention.

Referring now to FIG. 3, the manifold portion 15 will be described in more detail. The manifold 15 includes a manifold housing 45 which defines the inlet port 29 and the fluid passage 31. The manifold housing 45 may be adapted to be remote from the pump 13, or may, as suggested in FIG. 1, be sealingly attached to the pump 13.

The manifold housing 45 defines a large central chamber 47, and an interconnected return passage 49 connected to the return side of the pump 13. The chamber 47 and passage 49 together serve the function of the left and right passages 41 and 43 shown schematically in FIG. 2, when the transaxle is operating in the normal, forward direction.

The manifold housing 45 further defines a pair of generally cylindrical recesses 51 and 53, which are preferably arranged to be oppositely and symmetrically disposed. The manifold housing 45 also defines left and right annular grooves 55 and 57, the function of which will be described subsequently. Finally, the manifold housing 45 defines left and right end faces 59 and 61, against which the left and right axle assemblies 17 and 19, respectively, are mounted.

Figure 5:
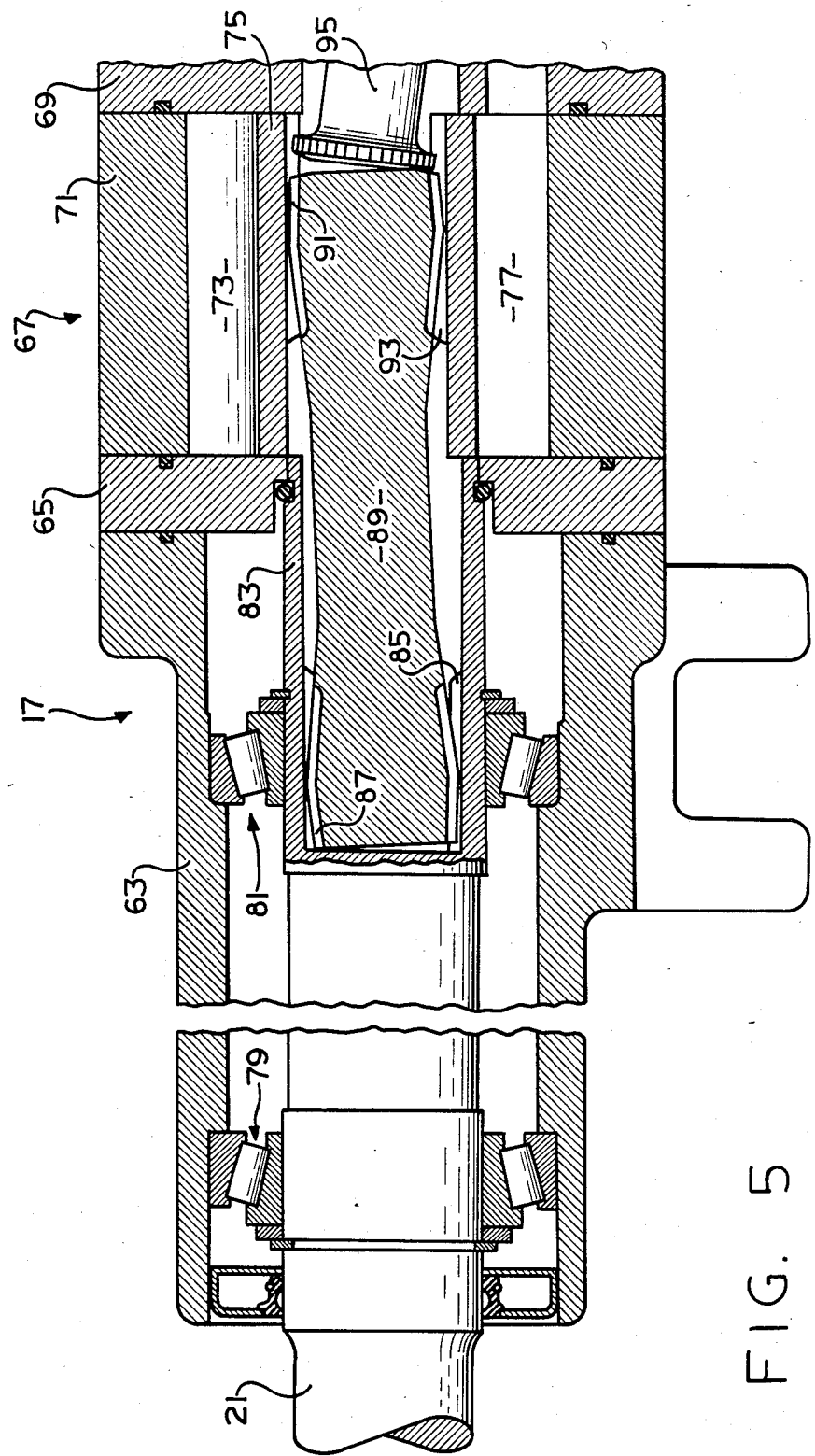
FIG. 5 is a horizontal, axial cross-section, which is axially foreshortened, and on the same scale as FIG. 3, showing the remainder of one of the axle assemblies.

Referring now to FIG. 5, in conjunction with FIG. 3, the left axle assembly 17 will be described in structural detail, it being understood that the right axle assembly 19 is a mirror image of the assembly 17. Thus, only the left axle assembly 17 will be described herein. The left axle assembly 17 comprises a plurality of sections including an axle support casing 63, a wear plate 65, a gerotor gear set 67, and a port plate 69. These elements 63, 65, 67, and 69 are secured together, and held in fixed sealing engagement with the left end face 59 of the manifold housing 45 by any suitable means, such as a plurality of bolts (not shown). Thus, the end face 59 and cylindrical recess 51 serve as a receiving (or mounting) portion for the axle assembly 17.

The gerotor gear set 67 is well known to those skilled in the art and will be described only briefly herein. In the subject embodiment, the gerotor 67 is a Geroler ® mechanism comprising an internally-toothed ring member 71, including a plurality of roller members 73 serving as the internal teeth. An externally-toothed star member 75 is eccentrically disposed within the ring member 71. Typically, the star member 75 has one less tooth than the number of rollers 73, thus permitting the star 75 to orbit and rotate relative to the ring 71. This orbital and rotational movement of the star 75 defines a plurality of expanding and contracting volume chambers 77. When pressurized fluid is communicated to the expanding volume chambers 77, the gerotor gear set 67 functions as a rotary fluid pressure actuated device, generating the torque output which is to be transmitted to the left axle shaft 21.

Referring now primarily to FIG. 5, the left axle shaft 21 is positioned within the axle support casing 63, and rotatably supported therein by suitable bearing sets 79 and 81. Toward its right end in FIG. 5, the axle shaft 21 defines a generally cylindrical portion 83 which defines a set of internal, straight splines 85. In engagement with the splines 85 is a set of external crowned splines 87 formed on one end of a main drive shaft 89. Disposed at the opposite end of the shaft 89 is another set of external, crowned splines 91 which are in engagement with a set of internal, straight splines 93, formed on the inside of the star member 75. Therefore, in the subject embodiment, because the ring 71 includes seven rollers 73, and the star member 75 includes six external teeth, seven orbits of the star 75 results in one complete rotation thereof, and one complete rotation of the drive shaft 89 and axle shaft 21.

Also in engagement with the internal splines 93 is an externally-splined valve drive shaft 95 which, at its other end is in driving engagement with a rotary disk valve member 97. The disk valve 97 is rotatably disposed within the cylindrical recess 51 defined by the manifold housing 45, and by means of the valve drive shaft 95, the disk valve 97 rotates at the speed of rotation of the star member 75.

Disposed in sealing engagement with the right end face of the disk valve 97 is a balancing ring 99, which is shown and described in greater detail in U.S. Pat. No. 3,572,983, assigned to the assignee of the present invention, and incorporated herein by reference. The disk valve 97 and the balancing ring 99 cooperate to divide the recess 51 into an annular outer chamber 101 which is in fluid communication with the left passage 33, and an annular inner chamber 103 which is in fluid communication with the central chamber 47.

The disk valve 97 defines a plurality of alternating valve passages 105 and 107, the passage 105 being in communication with the outer chamber 101, while the valve passages 107 are in communication with the inner chamber 103. The port plate 69 defines a plurality of passages 109, each of which is disposed to be in continuous fluid communication with an adjacent one of the volume chambers 77. Based upon the knowledge of those skilled in the art, and the incorporation of U.S. Pat. No. 3,572,983, the structural details of the valve passages 105 and 107 and the passages 109 will not be described further herein. As will be understood by those skilled in the art, the disk valve 97 and the port plate 69 comprise low-speed, commutating valving operable to communicate pressurized fluid to the expanding volume chambers of the gerotor 67 and to communicate exhaust fluid from the contracting volume chambers thereof.

It will be apparent to those skilled in the art from a review of this specification that the gerotor gear set 67, port plate 69, disk valve 97, drive shaft 89, and the parts associated therewith comprise the hydraulic motor 37 shown schematically in FIG. 2. Similarly, the parts of the right axle assembly 19 corresponding to those just referred to above would be understood to comprise the hydraulic motor 39 of FIG. 2.

Referring again to FIG. 2, it is one important aspect of the present invention that the transaxle assembly 11 include some sort of interwheel differential mechanism. In FIG. 2, such a differential mechanism is shown schematically as part of the manifold portion 15. Schematically, the interwheel differential mechanism, generally designated 111, comprises a rotary fluid displacement mechanism 113 in series flow relationship between the left passages 33a and 33b, and a rotary fluid displacement mechanism 115 in series flow relationship between the right passage 35a and 35b. Preferably, the mechanisms 113 and 115 have substantially equal fluid displacements, for reasons which will become apparent subsequently. Rotary portions of the mechanisms 113 and 115 are connected for common rotation by means of a shaft 117, as will be described in greater detail subsequently.

Disposed in parallel between the left passage 33b and right passage 35, downstream of the displacement mechanisms 113 and 115, respectively, is a selector valve 119, which is illustrated schematically in FIG. 2 as being actuated by means of a handle 121 or other mechanical input.

Figure 4:
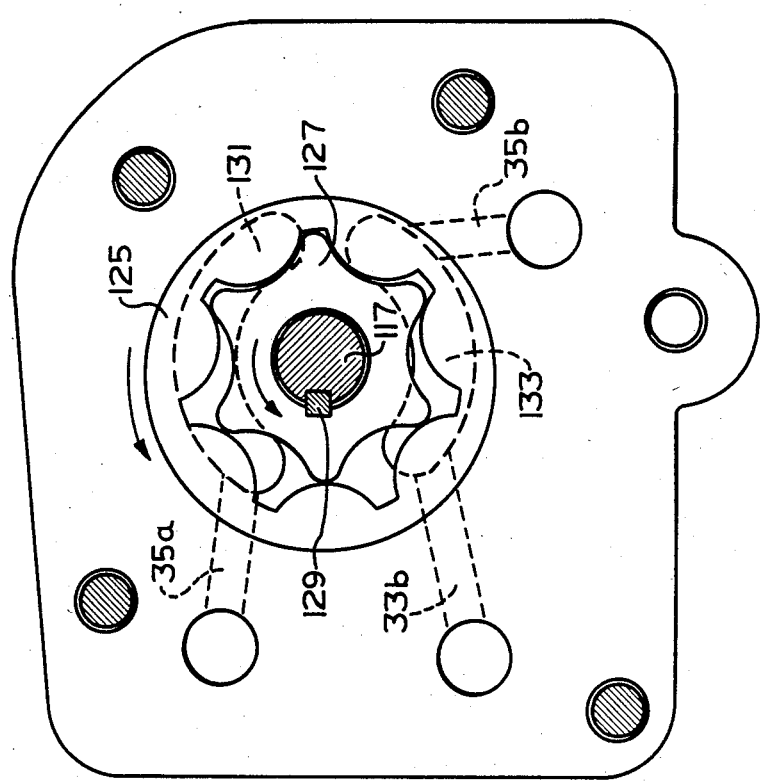
FIG. 4 is a transverse cross-section, taken generally along line 4—4 of FIG. 3, but showing a less schematic and more commercial version of that portion of the invention.

Referring now to FIG. 3, the differential mechanism 111 will be described in somewhat greater structural detail, although it should be noted that the cross-section in FIG. 3 of the mechanism 111 is still somewhat schematic in nature. The mechanism 111 includes a differential housing 123 which defines the left passages 33a and 33b and right passages 35a and 35b which are shown schematically in FIG. 2. Disposed within the housing 123 are the rotary fluid displacement mechanism 113 and 115 which, in the subject embodiment are substantially identical. Each displacement mechanism 113 and 115 comprises a small gerotor gear set of the fixed axis type, having an outer rotor 125 and an inner rotor 127. As may be seen by reference also to FIG. 4, which is somewhat less schematic than FIG. 3, the pair of inner rotors 127 are connected for common rotation by means of the shaft 117. Preferably, the inner rotors 127 are fixed relative to the shaft 117 by means of a key member 129. The mechanisms 113 and 115 are referred to as "fixed axis" gerotors because in each mechanism, both the outer rotor 125 and the inner rotor 127 rotate about their own axes, and both of these axes are fixed relative to the housing 123 and relative to each other.

The differential housing 123 defines a pair of inlet kidney ports 131, and a pair of outlet kidney ports 133. In the FIG. 3 embodiment, the left and right passages 33b and 35b are innerconnected, downstream of the mechanisms 113 and 115 in the same general manner as shown in FIG. 2, by means of a selector valve 119, which is shown in FIG. 3 as being actuated by a electromagnetic solenoid 135.

Referring again to FIG. 3, in conjunction with FIG. 2, the operation of the transaxle assembly 11, with special reference to the differential mechanism 111 will be described. When the selector valve 119 is in the position shown in FIG. 3, innerconnecting the left and right passages 33b and 35b, the transaxle operates in the same general manner as if the differential 111 were not present. Pressurized fluid is pumped through the conduit 27, into the inlet port 29, then through the fluid passage 31 into the left and right passages 33a and 35a, and from there into the inlet kidney ports 131. The flow is divided into two approximately equal parallel flow rates, entering the rotary displacement mechanisms 113 and 115, and because the inner rotors 127 are connected for common rotation by the shaft 117, the flow rates into the outlet kidney ports 133, and from there into the left and right passages 33b and 35b are maintained substantially equal. However, because the passages 33b and 35b are innerconnected by means of the selector valve 119, the transaxle assembly 11 will operate in the normal differentiating mode.

Therefore, if the vehicle steering wheel is turned to effect a left turn, the speed of rotation of the motor 37 and left axle shaft 21 will be much less than that of the motor 39 and right axle shaft 23. Consistent with this speed difference, the rate of fluid flow through the left passage 33b to the motor 37 will be much less than the rate of fluid flow through the right passage 35b to the motor 39. With the selector valve 119 in the position shown in FIG. 3, such a speed difference can occur because the selector valve 119 permits a certain amount of fluid from the left passage 33b to flow through the valve 119 to the right passage 35b, thus decreasing the fluid flow to the motor 37 and increasing the fluid flow to the motor 39 by the same amount.

If the vehicle operator does not wish to permit such normal differential action as described above, the operator may shift the selector valve 119 to the position shown in FIG. 2, such that the left and right fluid passages 33b and 35b are blocked from fluid communication with each other. As a result, the fluid output of the pump 13 will be divided into two equal parallel flow rates by the displacement mechanisms 113 and 115, and the flow rates through the motors 37 and 39 will be equal, as will be the output speeds of the left and right axle shaft 21 and 23. This mode of operation may be referred to as a "straight tracking" mode, although it would be more accurate to characterize this mode of operation as a "limited differential" mode. In this mode, it is still possible to have some differential action, and as used herein, subsequent references to "substantially equal speeds of the driven wheels" is actually intended to mean that each wheel will be maintained at a speed which is no less than about 70 percent of the speed of the other wheel.

When the vehicle encounters a loss of traction situation, the transaxle assembly 11 and differential mechanism 111 of this invention function in the following manner. With the selector valve 119 in the "limited differential" position shown in FIG. 2, blocking flow between the left and right passages 33b and 35b, any loss of traction by the left wheel (by way of example only) will result in a spinout or overspeed of the left axle shaft 21 and the motor 37. This condition will result in a drop in pressure in the left passage 33b and a pressure differential across the displacement mechanism 113, thus causing it to operate as a motor (rather than merely as a "meter" as it does during operation in the normal mode). When the mechanism 113 begins to operate as a motor, torque is transmitted from its inner rotor 127 by means of the shaft 117 to the inner rotor 127 of the displacement mechanism 115. Such a torque input to the mechanism 115 causes it to operate like a pump, thus increasing the downstream pressure in the right passage 35 which is communicated to the motor 39. One result will be that, although the flow rates to the motors 37 and 39 will still be substantially equal, the loss of torque at the wheel losing traction (left wheel in this example) will effectively be transferred to the wheel which still has traction.

Therefore, with the selector valve 119 in the "normal differentiating" position of FIG. 3, the hydraulic torque transmitted to the motors 37 and 39 will be substantially equal, but the flows are not necessarily equal. On the other hand, with the selector valve 119 in the "limited differential" position of FIG. 2, the rates of flow to the motors 37 and 39 will be kept substantially equal, although the hydraulic torques transmitted to the motors may not be equal. It is an important aspect of the present invention that the vehicle operator has the capability of selecting between the normal differentiating and limited differentiating modes, and that each mode is ideally suited to the operating conditions which are encountered while that particular mode is being utilized. It is also an important feature of the present invention that the operator has the ability to shift between the normal and limited modes while the vehicle is operating (i.e., "shift on the go"), rather than having to stop the vehicle and shift mechanically to the desired mode.

Referring still to FIGS. 2 and 3, it should be noted that the output of the charge pump 25 is communicated through a filter 137, then through a conduit 139 to a conduit 141 which is connected in parallel across the left and right fluid passages 33b and 35b. Disposed in the conduit 141 is a left check valve 143 and a right check valve 145. Also in communication with the conduit 139 is a conduit 147 (shown only in FIG. 2) which is communicated back to the inlet of the pump 13 (i.e., when the pump is operating in the normal forward condition). Disposed in the conduit 147 is a check valve 149. When the vehicle and the transaxle assembly are operating in the normal forward condition, "make-up" fluid is communicated under pressure from the charge pump 25 past the check valve 149 and through the conduit 147 back to the pump inlet to compensate for any case drain leakage out of the hydraulic circuit shown in FIG. 2.

If the vehicle operator reverses the direction of operation of the variable pump 13 to drive the vehicle in reverse, the pump output will flow through the left and right passages 41 and 43, then through the motors 37 and 39, respectively, driving the axle shafts 21 and 23 in reverse. Exhaust flow out of the motors 37 and 39 will flow through the left and right passages 33b and 35b, then through the differential mechanism 111 in a manner just the opposite of that previously described, and finally, fluid will flow from the port 29 of the manifold housing 45 back through the conduit 27, to the port of the pump 13 which is now functioning as the inlet port. During such operation in reverse, the pressurized make-up fluid from the charge pump 25 will flow through the conduit 139 into the conduit 141 and past one or both of the check valves 143 and 145 to provide make-up fluid in whichever of the passages 33b or 35b is at relatively lower pressure.

FIG. 6 EMBODIMENT

Figure 6:
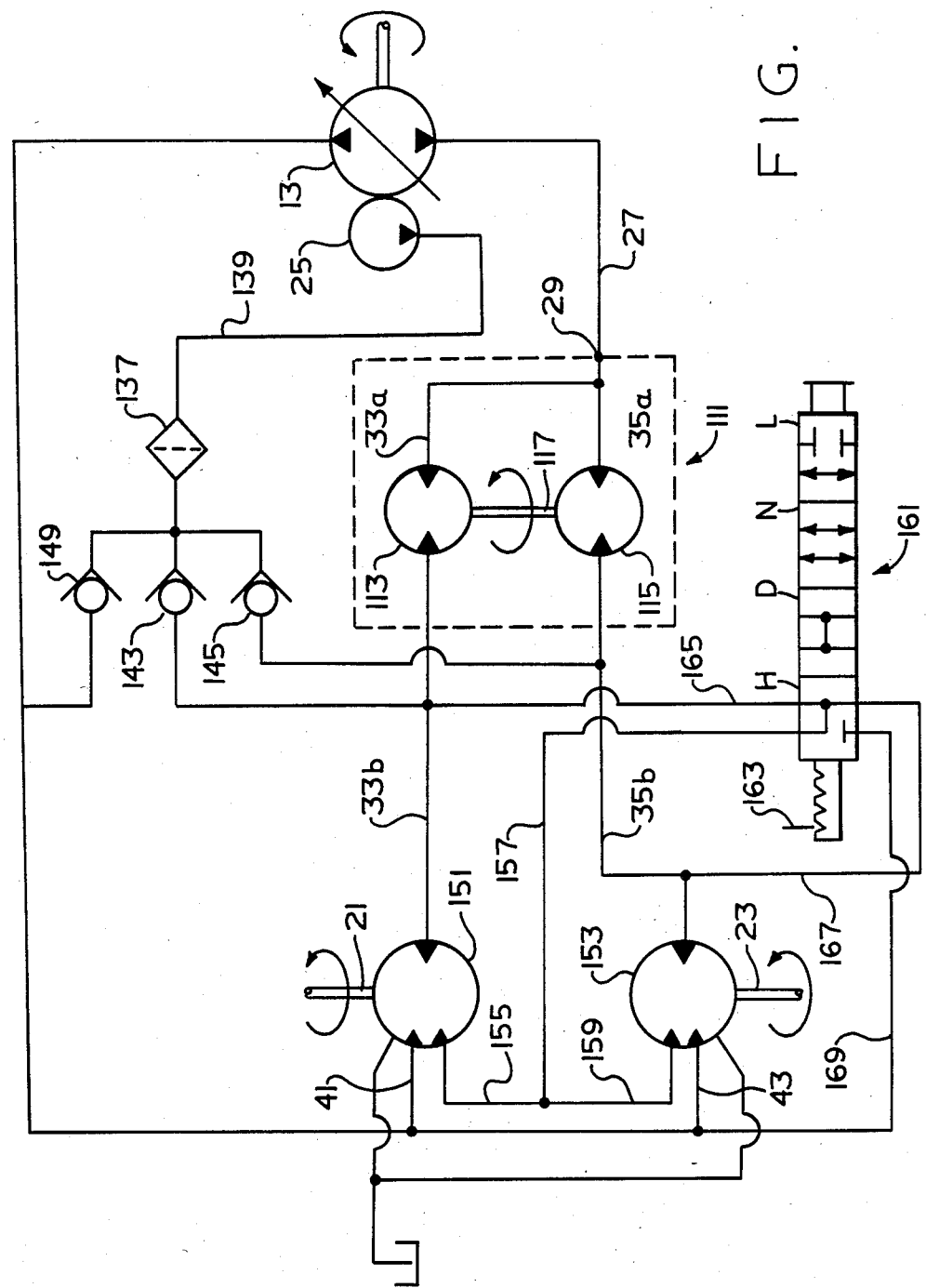
FIG. 6 is a hydraulic schematic, similar to FIG. 2, illustrating an alternative embodiment of the present invention, including several additional operating modes.

Referring now to FIG. 6, there is illustrated an alternative embodiment of the present invention in which the vehicle operator is provided with the capability of selecting from several additional operating modes. In the FIG. 6 embodiment, elements which are the same or substantially the same as in the embodiment of FIGS. 1 through 5 bear the same reference numeral, with elements which are new, or substantially different, bearing reference numerals in excess of 150.

In the FIG. 6 embodiment, one of the primary differences is that the conventional, single-speed motors 37 and 39 have been replaced by two-speed hydraulic motors 151 and 153. As used herein, the term "two-speed" refers to a hydraulic motor which may be operated in either a low-speed, high-torque mode (low range) or a high-speed, low-torque mode (high range). Preferably, the two-speed motors for use in the FIG. 6 embodiment of the invention are made in accordance with U.S. Pat. No. 4,480,971, which is assigned to the assignee of the present invention and is incorporated herein by reference.

As is well known to those skilled in the art, in a two-speed hydraulic motor of the type shown in the above-incorporated U.S. Pat. No. 4,480,971, the fluid pressure actuated device (e.g., the gerotor gear set) may be substantially the same as in conventional one-speed motors, and in fact, the low-range operation of a two-speed motor is identical to the operation of a conventional one-speed motor. However, in the high-range mode of operation, a portion of the fluid which is communicated from the contracting volume chambers, instead of being communicated to the system reservoir, is recirculated back to one or more of the expanding volume chambers. The net result is that several of the expanding volume chambers are "disabled", which effectively reduces the displacement of the gerotor gear set. Therefore, in the high range, for a given flow and pressure, the output of the motor will be at a lower torque, but at a higher speed.

That the motors 151 and 153 are two-speed motors is illustrated schematically in FIG. 6 by showing each motor as having two outlet ports. The conventional outlet ports of the motors 151 and 153 are in communication with the left and right passages 41 and 43, respectively, which are in turn communicated back to the inlet of the pump 13 as was explained in connection with the embodiment of FIGS. 1 through 5. The other outlet of the motor 151 is communicated by means of a passage 155 to a passage 157, while the other outlet of the motor 153 is in communication with the passage 157 by means of a passage 159.

The other major difference in the embodiment of FIG. 6 is that the selector valve 119 is replaced by a four-position, four-way selector valve 161, which may be actuated in any suitable manner, and is shown schematically in FIG. 6 as including a detent mechanism 163.

The selector valve 161, as shown in FIG. 6, provides the vehicle operator with a selection among four different operating modes as follows:

(1) high range (H);
(2) dump mode (D);
(3) normal differentiating mode (N); and
(4) low range and limited differentiation (L).

With the selector valve 161 in H, exhaust fluid from the motors 151 and 153 is communicated through the passage 157 to the selector valve 161, at which point it divides, flowing through passages 165 and 167. Fluid in passage 165 combines with fluid in the left passage 33$b$ to achieve high-range operation of the motor 151, while fluid in the passage 167 combines with fluid in the right passage 35$b$ to achieve high-range operation of the motor 153.

When the selector valve 161 is shifted to D, the passage 157 is in communication through a passage 169 with left and right passages 41 and 43, all of which are in communication within the inlet of the pump 13. At the same time, the normally-pressurized passages 33$b$ and 35$b$ are in communication with the passage 169 through passages 165 and 167, respectively. The result is that when the selector valve 161 is in D, all passages upstream and downstream of the motors 151 and 153 are communicated back to the pump, and because there is no pressure differential across the motors 151 and 153, the motors are able to turn relatively freely, and the vehicle may be towed fairly easily.

When the selector valve 161 is shifted to N, the resulting operation corresponds to the position of the selector valve 119 shown in FIG. 3. With the selector valve 161 in N, the passage 157 is in communication with the passage 169, and the motors 151 and 153 operate in low range (low-speed, high-torque). At the same time, the passages 165 and 167 are interconnected, which permits normal differentiating action to occur, i.e., the speeds of the motors 151 and 153, and the left axle shaft 21 and right axle shaft 23, may differ substantially to permit turning of the vehicle, etc.

When the selector valve 161 is in L, the resulting operation corresponds to the position of the selector valve 119 in FIG. 2, i.e., the motors 151 and 153 again operate in low range because the passage 157 is in communication with the passage 169. However, with the selector valve 161 in L, communication between the passages 165 and 167 is blocked, resulting in limited differentiating action, as was described in connection with the embodiment of FIGS. 1 through 5.

It will be understood by those skilled in the art that, within the scope of the present invention, the selector valve may have either of the H and D positions in combination with the N and L positions or, in addition thereto, may have certain other valve position and operating modes which are known to those skilled in the art. Furthermore, although the fluid displacement mechanisms 113 and 115 have been illustrated herein as comprising gerotor gear sets, various other positive displacement mechanisms may be utilized, as long as the mechanisms are able to achieve the objective of separating fluid flow into two substantially equal flow paths. Finally, it should also be appreciated that various configurations of selector valve and various actuating modes therefore may be utilized, as long as the selector valve is able to select between two positions, one of which results in normal differentiating action, and the other of which results in limited differentiating action.

I claim:

1. A hydrostatic transaxle assembly for use on a vehicle having a vehicle frame, a source of motive power, a fluid pump driven by said source of power, and a pair of driven wheels, the pump having a fluid inlet and a fluid outlet; said transaxle assembly comprising a centrally-disposed manifold and first and second motor assemblies; said manifold defining a fluid inlet adapted to be in fluid communicatin with the fluid outlet of the fluid pump, and a fluid outlet adapted to be in fluid communication with the fluid inlet of the pump, and first and second fluid passage means communicating between said fluid inlet and said fluid outlet of said manifold and flowing through said first and second motor assemblies, respectively; each of said first and second motor assemblies having a rotary fluid pressure actuated device and axle means operable to transmit the rotary output of said fluid pressure actuated device to the respective driven wheel, said fluid pressure actuated devices having substantially equal fluid displacement; characterized by:

(a) interwheel differential means including first and second rotary fluid displacement mechanisms disposed in series flow relationship in said first and second fluid passage means, respectively, said first and second fluid displacement mechanisms having substantially equal fluid displacement and including first and second rotor elements, respectively, said first and second rotor elements being connected for common rotation;

(b) selector valve means in fluid communication with at least one of said fluid displacement mechanisms and operable selectively between:

(i) a first position in which fluid flowing from the fluid pump into said fluid inlet of said manifold flows through said first and second fluid displacement mechanisms in two substantially equal flows, substantial fluid communication between said first and second fluid passage means is prevented, downstream of said first and second fluid displacement mechanisms, to maintain substantially equal flows through said fluid pressure actuated devices of the motor assemblies and substantially equal speeds of the driven wheels; and (ii) a second position in which the fluid flows through the fluid pressure devices of the motor assemblies are not maintained substantially equal, thus permitting normal differentiation between said motor assemblies and the speeds of the driven wheels.

2. A hydrostatic transaxle assembly as claimed in claim 1 characterized by the pair of driven wheels comprising the sole source of propulsion for the vehicle and said transaxle assembly comprising the sole source of propulsion for the driven wheels.

3. A hydrostatic transaxle assembly as claimed in claim 1 characterized by said transaxle assembly including mounting means adapted to mount said transaxle assembly in fixed relationship to the vehicle frame.

4. A hydrostatic transaxle assembly as claimed in claim 1 characterized by said rotary fluid pressure actuated devices of said first and second motor assemblies comprising low-speed, high-torque gerotor devices, defining expanding and contracting fluid volume chambers, each of said motor assemblies further comprising low speed, commutating valving operable to communicate pressurized fluid to said expanding volume chambers and to communicate exhaust fluid from said contracting volume chambers.

5. A hydrostatic transaxle assembly as claimed in claim 1 characterized by said rotary fluid displacement mechanisms of said differential means comprising substantially identical first and second internal gear sets, each including an outer rotor and an inner rotor, said inner rotors comprising said rotor elements connected for common rotation.

6. A hydrostatic transaxle assembly as claimed in claim 5 characterized by said internal gear sets each comprising a fixed axis gerotor gear set including an internally-toothed outer rotor and an externally-toothed inner rotor.

7. A hydrostatic transaxle assembly as claimed in claim 1 characterized by the fluid pump including charge pump means and further characterized by check valve means operable to permit fluid communication between said charge pump means and whichever of said first and second fluid passage means is at lower fluid pressure.

8. A hydrostatic transaxle assembly as claimed in claim 7 characterized by said check valve means including first and second check valves disposed to permit fluid communication from said charge pump means to said first and second fluid passage means, respectively, at locations downstream of said first and second fluid pressure actuated devices of said first and second motor assemblies, respectively, when said transaxle assembly is operating in reverse.

9. A hydrostatic transaxle assembly as claimed in claim 8 characterized by said check valve means including a third check valve disposed to permit fluid communication from said charge pump means to one of said first and second fluid passage means, at a location downstream of said first and second motor assemblies, when said transaxle assembly is operating in the normal, forward direction.

10. A hyirostatic transaxle assembly as claimed in claim 1 characterized by said selector valve means being connected in parallel between said first and second fluid passage means; said first position comprising said selector valve means blocking fluid communication therethrough between said first and second fluid passage means; said second position comprising said selector valve means permitting relatively unrestricted communication between said first and second fluid passage means.

11. A hydrostatic transaxle assembly as claimed in claim 10 characterized by said selector valve means being movable to a third position in which pressurized fluid from both of said first and second fluid passage means is communicated from locations upstream of said first and second motor assemblies, respectively, to locations downstream of said first and second motor assemblies, respectively, thus bypassing said fluid pressure actuated devices of said first and second motor assemblies and dumping pressurized fluid.

12. A hydrostatic transaxle assembly as claimed in claim 10 characterized by said rotary fluid pressure actuated devices of said first and second motor assemblies comprising low-speed, high-torque gerotor devices defining expanding and contracting fluid volume chambers, each of said motor assemblies further comprising low-speed, commutating valving operable to communicate pressurized fluid to said expanding volume chambers and to communicate exhaust fluid from said contracting volume chambers during operation of said first and second motor assemblies in the low-speed, high-torque mode of operation.

13. A hydrostatic transaxle assembly as claimed in claim 12 characterized by each of said first and second motor assemblies also being capable of operating in a high-speed, low-torque mode of operation, and being further characterized by said selector valve means being movable to a fourth position in which a portion of the exhaust fluid from said contracting volume chambers of said first and second motor assemblies is communicated to one or more of said expanding volume chambers of said first and second motor assemblies to achieve said high-speed, low-torque mode of operation.

14. A hydrostatic transaxle assembly for use on a vehicle having a vehicle frame, a source of motive power, a fluid pump driven by said source of power, and a pair of driven wheels comprising the sole source of propulsion for the vehicle; said transaxle assembly being the sole source of propulsion for the driven wheels and comprising a centrally-disposed manifold and first and second motor assemblies; said manifold defining a fluid inlet adapted to be in fluid communication with the fluid outlet of the fluid pump, and a fluid outlet adapted to be in fluid communication with the fluid inlet of the pump, and first and second fluid passage means communicating between said fluid inlet and said fluid outlet of said manifold and flowing through said first and second motor assemblies, respectively; each of said first and second motor assemblies having an orbiting gerotor gear set and axle means operable to transmit the rotary torque output of said gerotor gear set to the respective driven wheel, said gerotor gear sets of said first and second motor assemblies having substantially equal fluid displacements; characterized by:

(a) interwheel differential means including first and second rotary fluid displacement mechanisms disposed in series flow relationship in first and second fluid passage means, respectively, said first and second fluid displacement mechanisms having substantially equal fluid displacement and including first and second rotor elements, respectively, said first and second rotor elements being connected for a common rotation;

(b) selector valve means connected in parallel fluid communication between said first and second fluid passage means and operable selectively between:

(i) a first position in which fluid flowing from the fluid pump into said fluid inlet of said manifold flows through said first and second fluid displacement mechanisms in two substantially equal flows, said selector valve means preventing substantial fluid communication between said first and second fluid passage means, downstream of said first and second fluid displacement mechanisms, to maintain substantially equal flows through said gerotor gear sets of said first and second motor assemblies and substantially equal speeds of the driven wheels; and (ii) a second position permitting relatively unrestricted fluid communication between said first and second fluid passage means, to permit substantially different fluid flows through said gerotor gear sets of said first and second motor assemblies, thus permitting normal differentiation between said motor assemblies and the speeds of the driven wheels.

* * * * *